UNITED STATES PATENT OFFICE.

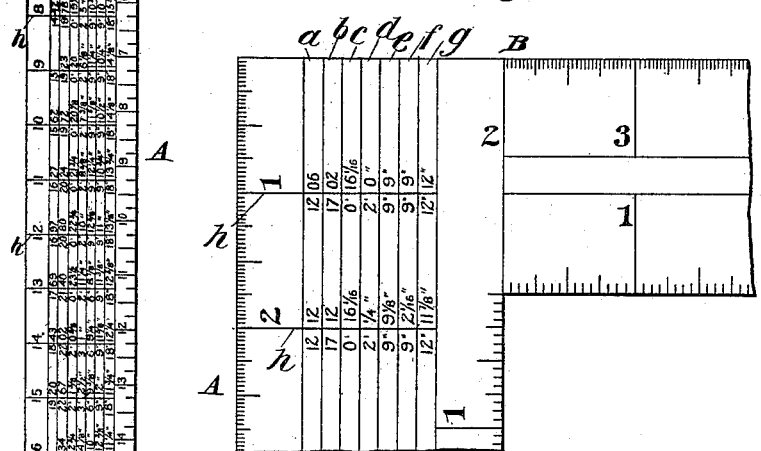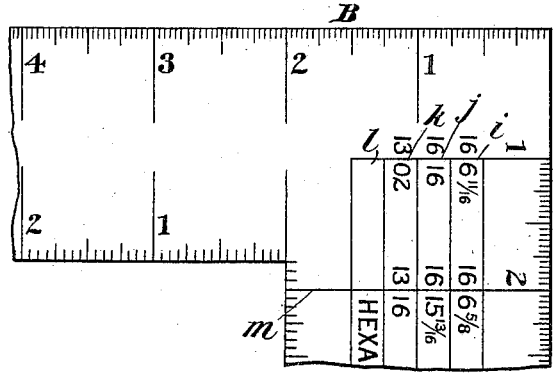

MOSES NICHOLLS, OF GLENWOOD, IOWA.

SQUARE.

SPECIFICATION forming part of Letters Patent No. 672,455, dated April 23, 1901.

Application filed November 13, 1897. Serial No. 658,462. (No model.)

*To all whom it may concern:*

Be it known that I, MOSES NICHOLLS, residing at Glenwood, in the county of Mills, in the State of Iowa, have invented a new and useful Square, of which the following is a specification.

This invention relates to squares; and the object of same is to produce a square having a certain arrangement of figures thereon, whereby certain information useful to carpenters in framing roofs is provided.

With the above object in view the invention consists in the novel arrangement and combination of the figures arranged upon a square, as hereinafter set forth.

In the accompanying drawings, Figure 1 is a view of one of the faces of the square, showing the arrangement of figures thereon. Fig. 2 is a view of the other face thereof. Fig. 3 is an enlarged detailed view of a portion of the square. Fig. 4 is a similar view of the opposite face.

In framing the different pieces of material for buildings and other structures it is important that they be cut upon the proper inclination or slant to make strong joints, and especially with rafters. Efforts have been made to provide squares with tables by which the angles may be indicated or computed; but as the different dimensions of the different structures require different angles it has been found impossible to form such a comprehensive table upon the square as to answer for all the purposes for which it is intended, and the computations have been too complicated or difficult for general use. In formulating the tables or scales for use upon my square I have computed them for unity or for a single standard measure, as a foot or the fractional part thereof, as an inch. With such an arrangement of figures the proper lengths can be found by simply multiplying the figures upon the square for one foot by the number of feet that the computation is to be made for, and the angles can be formed by placing the edges of the two members of the square upon the material at the particular graduation-marks thereon that are indicated by the figures of the scales lying under the inch for which the computation has been made.

To adapt the scale for as wide a scope of measurements as possible, the figures for each purpose are arranged longitudinally upon one or both faces of the scale, preferably upon the blade or main portion and under the inch for which they are computed, and a legend or statement is placed at the end of each row or series of figures for indicating its use.

In the drawings I have shown the sides of the square adapted for cutting rafters and have provided one surface with seven series or rows of figures, $a$, $b$, $c$, $d$, $e$, $f$, and $g$, which are intersected at right angles by the inch-marks $h$. At one end of the rows, preferably at the tip of the blade, the purpose or use of each row is set forth, as length of common rafters per foot run, length of hip and valley rafters per foot run, length of jack-rafters placed sixteen inches from centers, length of jack-rafters placed twenty inches from centers, side cut of jacks, (last-named figures give cut,) side cuts of hip and valley rafters against ridge-board and deck, and mitering, sheathing, and shingles in valley and hip, respectively.

In part of the rows, as the first two, the figures upon one side of the inch-lines $h$, preferably the left, indicate inches, and those upon the other side indicate fractional parts thereof, as the hundredths of an inch, while in the next two rows the figures upon one side, preferably the left, indicate feet, and those upon the other side indicate inches and the fractional parts thereof. In the last three rows figures upon one side of the line indicate inches which refer to the inch-marks on one part of the square, as upon the blade A, and those upon the other side of the line refer to the other part, as the tongue B. In using a square provided with figures arranged in this manner if the length of the rafter be desired for any rise the figures in the first row $a$ under the inch-number that indicates the rise are multiplied by half the width of the building—as, for instance, if the rise be eight inches to the foot and the width of the building be twenty feet the figures "14.42" under "8" are multiplied by one-half of twenty, or ten, which would give "144.20," or twelve feet and two inches. The length of the hip and valley rafters is found in the same manner by taking the figures in the second row $b$ and multiplying this by one-half the width of the building.

The figures in the third and fourth rows c and d indicate the lengths of the first jack-rafters when spaced sixteen or twenty inches from the centers, respectively, and also the difference in lengths between the successive rafters. For instance, if the rise be eight inches to the foot the length of the first jack-rafter will be nineteen and one-fourth inches, the number under "8" in the third row, if they are spaced sixteen inches to centers, and each succeeding rafter will be nineteen and one-fourth inches longer than the preceding one; but if the rafters are spaced twenty inches to centers the first jack will be two feet four and thirteen-sixteenths inches, or two feet and five inches in whole numbers, the numbers under "8" in the fourth row, and each succeeding rafter will be that much longer than its predecessor.

In the foregoing computations the figures indicate lengths in a straight line, or the points at which the rafters are to be cut; but it is necessary that the cut be made upon an angle at the side to cause the ends of the rafters to fit against the hip-rafter. As these angles are computed relatively to a right angle and the blade and tongue of the square are always located at that angle relatively to each other, and as the inch-marks upon one member, as the blade, bear a certain fixed relation to those upon the other member or tongue, I utilize this relation or ratio for placing the square upon the rafter for marking the angle upon which the cut is to be made. For instance, if it be desired to mark the angle on which the sides of the rafters are to be cut the figures under the inch-mark indicating the rise will indicate the inch-marks at which the respective members of the square must be placed upon the edge of the timber, the figures upon one side of the line being for the inch-mark upon one member and those upon the other side being for the other member.

If the rise be eight inches, an examination of the fifth row of figures e will show the numbers "9" and "10¾" below the figure "8," which will indicate that one member of the square, preferably the blade, must be placed with the inch-mark "9" on the edge of the timber and the other member be placed with its inch-mark "10¾" on the edge. The portion of the end of the member beyond the last-named figure will indicate the angle on which the rafter must be cut.

If it be desired to cut the rafter to fit the ridge-board or deck instead of the hip-rafter, the numbers in the sixth row f are used in the same manner as the fifth row—that is, one member of the square must be placed at the nine-inch mark and the other one at "10," because these are the figures found in the sixth row below the figure "8," that being the rise per foot.

In the seventh row g the figures will indicate the inch-marks at which the two members of the square must be placed for cutting the miter or angle of the sheathing and shingles in the valleys or on the hip. For instance, the numbers "18" and "15⅝" are found under "8," which indicate that the eighteen-inch mark on the blade must be set at the edge and the fifteen and five-eighths inch mark of the tongue must be set on the edge and the angle be cut along the edge of the tongue that projects beyond the fifteen and five-eighths inch mark.

From the foregoing it will be seen that the only computation required will be for the length of the common and of the hip and valley rafters, which will be very simple, the basic figures being computed for unity. The figures in the other rows require no computation, but indicate the positions in which the square is to be placed to secure the required angle, thus enabling the workman to quickly lay off his work without the possibility of error except in the computations, but in which the liability of error is reduced to a minimum.

The figures under each inch-mark indicate the figures that are to be used for that rise of the roof to the foot and for no other rise, thus making an invariable relation between the inch-mark and the figures below it. The figures in part of the rows, as the last three, are virtually two sets of figures for each inch-mark, one upon one side of the inch mark or line and the other upon the other side. Although these two sets of figures have no relation to each other, yet they have a relation to the inch-mark of the square under which they are placed, and each one of them is a duplicate of some inch-mark upon one or the other of the two members of the square to which they direct attention.

The opposite face of the blade of the square may be provided with four rows of figures i, j, k, and l for the side cut of jack-rafters against octagon rafters, side cut of octagon hip-rafters, length of octagon hip-rafters, and miter cuts for polygons, respectively. The figures in the first two rows i and j are arranged relatively to the respective inch-marks under which they are placed and are to be used in the same manner as has been described for the last three rows e, f, and g upon the first-mentioned face of the square. The figures in the third row k indicate the lengths of the octagon hip-rafters per foot run and are to be used in the same manner as described for the first two rows a and b on the other side. The figures in the fourth row l are arranged arbitrarily, and those after each name, as hexagon "24 14," heptagon "24 11½," &c., indicate that when the twenty-four and fourteen and the twenty-four and eleven and one-half inch marks, respectively, are placed upon the edge of the material to be cut the end of the arm or member extending beyond the last-mentioned figure will indicate the miter or angle on which the material must be cut to form a hexagon or a heptagon, as the case may be.

Instead of using the figures given, other marks upon the square with the same ratio or relation to each other may be used—as, for instance, the inch-marks "12" and "7" could be used instead of "24 14," &c.

The short arm or tongue B of the square, which is preferably made of the same width as the thickness of the usual run of lumber—say, one and three-fourths inches—has a central longitudinally-arranged row of figures $n$, which indicate the total lengths of common rafters for roofs of various widths having a rise of one foot per foot run. Thus in a twenty-four foot run with a rise of twelve inches per foot run the hypotenuse or rafter would be 33.95 feet. The length of rafters for twenty-seven feet would be 38.19 feet, &c.

As above described, it will be seen that I have produced a square which can be provided with characters or figures at the time of its manufacture or subsequent thereto by means of which work can be quickly and accurately laid off. By giving the figures for unity the correct figures for different measurements can be readily found, which will be absolutely correct, thereby adapting my square for use upon iron structures, where the different angles must be cut more accurately than may be used upon wood or ordinary timbers.

Having thus fully described my invention, what I claim as new, and desire to secure by Letters Patent, is—

1. A square having numbered inch-marks upon each of its members, and one surface of one of its members being provided with longitudinally-arranged rows of figures, the figures on one side of each inch-mark in part of the rows referring to an inch-mark on one member of the square and the adjoining figures upon the other side of said mark in the same row referring to an inch-mark on the other member, substantially as described.

2. A square having numbered inch-marks upon each of its members, and one surface of one of its members being provided with longitudinally-arranged rows of figures, the figures in the different rows having a fixed relation to the inch-mark numbers under which they are placed, the figures in a portion of the rows being arranged in independent sets under each inch-number, there being a set upon each side of the inch-mark in each of said last-mentioned rows, the figures of one set under each inch-number referring to an inch-mark on one member of the square and the figures of the other set referring to an inch-mark on the other member, substantially as described.

MOSES NICHOLLS.

Witnesses:
J. M. KEMPTON,
H. C. BOWER.